(12) United States Patent
Dams et al.

(10) Patent No.: US 7,704,600 B2
(45) Date of Patent: Apr. 27, 2010

(54) GROUT POWDER CONTAINING A FLUOROCHEMICAL COMPOUND

(75) Inventors: Rudolf J. Dams, Antwerp (BE); Volker Rinke, Wuppertal (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/147,147

(22) Filed: May 16, 2002

(65) Prior Publication Data

US 2003/0051639 A1    Mar. 20, 2003

(30) Foreign Application Priority Data

May 29, 2001   (EP)   ................... 01202026

(51) Int. Cl.
   *B32B 13/00*   (2006.01)
   *B32B 5/16*    (2006.01)
   *B05D 3/10*    (2006.01)

(52) U.S. Cl. .................. 428/325; 428/403; 428/323; 428/331; 428/404; 428/405; 427/201; 427/212; 427/215; 427/219; 427/220

(58) Field of Classification Search ............ 428/403, 428/402, 404, 406, 407; 106/724
   See application file for complete search history.

(56) References Cited

U.S. PATENT DOCUMENTS

| | | | |
|---|---|---|---|
| 2,803,615 A | 8/1957 | Ahlbrecht | |
| 3,094,547 A | 6/1963 | Heine | |
| 3,318,852 A | 5/1967 | Dixon | |
| 3,330,812 A | 7/1967 | Smith | |
| 3,341,497 A | 9/1967 | Sherman | |
| 3,398,182 A | 8/1968 | Guenthner | |
| 3,810,874 A | 5/1974 | Mitsch | |
| 3,859,233 A | 1/1975 | Barker | |
| 3,965,096 A | 6/1976 | Reinisch et al. | |
| 4,013,627 A | 3/1977 | Temple | |
| 4,085,137 A | 4/1978 | Mitsch et al. | |
| 4,410,367 A * | 10/1983 | LeGrand | 106/284.06 |
| 4,472,540 A | 9/1984 | Barker | |
| 4,477,498 A | 10/1984 | Deiner et al. | |
| 4,556,426 A * | 12/1985 | Chesney, Jr. et al. | 106/18.32 |
| 4,616,050 A | 10/1986 | Simmons et al. | |
| 4,649,063 A | 3/1987 | Canova et al. | |
| 4,681,790 A | 7/1987 | Fong | |
| 4,775,554 A | 10/1988 | Ponjee | |
| 5,209,775 A | 5/1993 | Bank et al. | |
| 5,226,954 A | 7/1993 | Suzuki | |
| 5,274,159 A | 12/1993 | Pellerite et al. | |
| 5,306,758 A | 4/1994 | Pellerite | |
| 5,442,011 A | 8/1995 | Halling | |
| 5,532,304 A | 7/1996 | Miyazaki et al. | |
| 5,547,711 A | 8/1996 | Kirchmeyer et al. | |
| 5,550,184 A | 8/1996 | Halling | |
| 5,554,709 A | 9/1996 | Emmerling et al. | |
| 5,569,696 A | 10/1996 | Abramson et al. | |
| 5,608,003 A | 3/1997 | Zhu | |
| 6,121,354 A | 9/2000 | Chronister | |
| 6,268,423 B1 | 7/2001 | Mayer et al. | |
| 6,383,569 B2 * | 5/2002 | Ornstein et al. | 427/389.7 |
| 6,646,088 B2 | 11/2003 | Fan et al. | |
| 6,656,258 B2 * | 12/2003 | Elsbernd et al. | 106/287.1 |
| 2002/0068777 A1 | 6/2002 | Lu et al. | |
| 2003/0105220 A1 | 6/2003 | Gupta et al. | |

FOREIGN PATENT DOCUMENTS

| | | | |
|---|---|---|---|
| CN | 1093690 | | 10/1994 |
| EP | 0 301 487 | | 2/1989 |
| EP | 0 498 442 | | 8/1992 |
| EP | 526976 | | 1/1997 |
| EP | 1 262 464 | | 12/2002 |
| GB | 2 218 097 | | 11/1989 |
| GB | 2218097 | A * | 11/1989 |
| GB | 2 339 776 | | 2/2000 |
| JP | 53099228 | | 8/1978 |
| JP | 54-11931 | | 1/1979 |
| JP | 55042272 | A * | 3/1980 |
| JP | 2-14857 | | 1/1990 |
| JP | 3-261642 | | 11/1991 |
| JP | 03261642 | A * | 11/1991 |
| JP | 3265670 | | 11/1991 |
| JP | 10-10136 | | 1/1998 |
| JP | 2000178064 | | 6/2000 |
| RU | 2134669 | | 8/1999 |
| WO | WO 99/16809 | | 4/1999 |
| WO | WO 03/040209 | | 5/2003 |
| WO | WO 03/082997 | | 10/2003 |

OTHER PUBLICATIONS

Kirk-Othmer, Encyclopedia of Chemical Technology, 3$^{rd}$ Ed., vol. 24, pp. 448-451.
U.S. Application entitled "Stain Resistant Polyurethane Coatings", filed Oct. 1, 2004, having U.S. Appl. No. 10/957,355.

* cited by examiner

*Primary Examiner*—Monique R Jackson
(74) *Attorney, Agent, or Firm*—Lisa P. Fulton

(57) ABSTRACT

The invention relates to grout powder for admixture with water to produce grout. The grout powder comprises cement powder and is characterized in that the grout powder has been mixed with a fluorochemical compound. The present invention further relates to a method of preparing grout powder for admixture with water to produce grout, comprising mixing grout powder comprising cement powder with a fluorochemical compound. Still further, the invention relates to an alternative method for making the grout powder, which method comprises treating at least one of the components of the grout powder with a fluorochemical compound.

16 Claims, No Drawings

GROUT POWDER CONTAINING A FLUOROCHEMICAL COMPOUND

CROSS REFERENCE TO RELATED APPLICATIONS

This application claims priority from European Application No. 01202026.9, filed May 29, 2001.

FIELD OF THE INVENTION

The present invention relates to grout powder for producing grout upon admixture with water. In particular, the present invention relates to grout powder that has been mixed with a fluorochemical compound.

BACKGROUND OF THE INVENTION

As is well known, spaces between tiles that are fixed to a wall or floor are typically filled with grout, which is produced by mixing grout powder with water. Because of the presence of cement powder, the grout upon drying will cure and effectively adhere and fill the spaces between the tiles. For improving the stain repellency, the tiles may have been surface treated with a fluorochemical composition which generally also provides water and oil repellency to the tile surface. Such is for example of particular interest for bathroom tiles. For example, it has been disclosed to use a fluorochemical silane to treat for example the surfaces of tiles to render these oil- and water repellent as illustrated for example by U.S. Pat. Nos. 5,608,003; 5,442,011; 5,550,184; and 5,274,159.

However, while the tile surface is thereby rendered repellent to water, oil and dirt, the grout spaces between them, when left untreated, still pick up dirt thereby somewhat reducing the benefits of having treated tiles. Accordingly, it has already been proposed to also treat the surface of the grout between the tiles with a fluorochemical compound in order to effect repellency properties also to the grout. For example, GB Pat. No. 2,218,097 and U.S. Pat. No. 5,209,775, disclose treatment of tiles as well as cured cement materials on the surface of a grout with a fluorochemical silane compound.

Although these treatments of the grout surface are effective, the durability of the treatment leaves a desire for further improvement. Also, applying the treatment to a grout filling a space between tiles would be highly labor intensive and therefore costly.

It would thus be desirable to provide oil- and/or water repellency as well as stain repellency to grout in a cost effective way and preferably with improved durability.

SUMMARY OF THE INVENTION

It has now been found that by mixing a fluorochemical compound with the grout powder from which grout is normally produced by mixing the powder with water, a grout can be obtained that has desirably oil-, water- and/or stain-repellency properties in a cost effective and convenient way. In particular, no separate additional treatment of the grout is needed after its application between for example tiles to fill spaces there between. Additionally, the durability of the treatment is improved relative to a treatment of the same fluorochemical compound to the surface of the grout. Surprisingly, although the fluorochemical compound is admixed in the mass of the grout powder and would thus be expected to be available in lesser amounts at the surface compared to a topical treatment of the grout with the fluorochemical compound, only small amounts of the fluorochemical compound are needed and the adherence of the grout between tiles is thereby not adversely affected.

Thus, in one aspect, the invention relates to grout powder for admixture with water to produce grout, said grout powder comprising cement powder, characterized in that said grout powder has been mixed with a fluorochemical compound.

The present invention further relates to a method of preparing grout powder for admixture with water to produce grout, comprising mixing grout powder comprising cement powder with a fluorochemical compound.

Still further, the invention relates to an alternative method for making the grout powder, which method comprises treating at least one of the components of said grout powder with a fluorochemical compound.

DETAILED DESCRIPTION OF ILLUSTRATIVE EMBODIMENTS

The fluorochemical compound for use with the invention is typically a compound that has one or more fluorinated groups which can be monovalent or multivalent such as for example divalent. The fluorochemical compound can be polymeric, oligomeric or a simple fluorinated organic compound. Examples of fluorinated groups include in particular fluoroaliphatic groups, which are stable, inert, preferably saturated and non-polar as well as fluorinated polyether groups. The fluoroaliphatic group may be straight chain, branched chain, or cyclic or combinations thereof and may contain one or more heteroatoms such as oxygen, divalent or hexavalent sulfur, or nitrogen. The fluorinated group(s) are preferably fully-fluorinated, but hydrogen or chlorine atoms can be present as substituents if not more than one atom of either is present for every two carbon atoms. Suitable fluorinated groups generally have at least 3 and up to 18 carbon atoms, preferably 3 to 14, especially 4 to 10 carbon atoms, and preferably contain about 40% to about 80% fluorine by weight, more preferably about 50% to about 79% fluorine by weight. The terminal portion of the fluorinated group is typically a perfluorinated moiety, which will preferably contain at least seven fluorine atoms, e.g., $CF_3CF_2CF_2—$, $(CF_3)_2CF—$, $F_5SCF_2—$. The preferred fluorinated groups are fully or substantially fluorinated and include those perfluorinated aliphatic radicals of the formula $CF_nF_{2n+1}—$ where n is 3 to 18, particularly 4 to 10.

Examples of useful fluorochemical compounds include, for example fluorinated group containing urethanes, ureas, esters, amines (and salts thereof), amides, acids (and salts thereof), carbodiimide, guanidines, allophanates, biurets, oxazolidinones, and other substances containing one or more fluorinated groups, as well as mixtures and blends thereof. Such agents are well known to those skilled in the art, see e.g., Kirk-Othmer, Encyclopedia of Chemical Technology, $3^{rd}$ Ed., Vol. 24, pp 448-451 and many are commercially available as ready-made formulations. Useful fluorochemical compounds can be polymers containing multiple fluorinated groups such as polymers of fluorochemical acrylate and/or methacrylate monomers with copolymerizable non-fluorinated monomers. Such compounds include, for example, those described in U.S. Pat. Nos. 3,330,812; 3,341,497; 3,318,852; 4,013,627; and PCT Appln. No. WO 9916809. Further examples of fluorochemical compounds useful in the invention include those formed by the reaction of fluorinated, e.g. perfluoroaliphatic, organic compounds containing an active hydrogen with diisocyanates to provide fluorinated group-bearing polyurethanes. Such reaction products are described, for example, in U.S. Pat. No. 3,398,182. Another group of fluorochemical compounds are fluorinated radical-containing N-methylolcondensation products. These compounds are described in U.S. Pat. No. 4,477,498. Further examples include fluorinated radical-containing polycarbodiimides which can be obtained by, for example, reaction of perfluoroaliphatic sulfonamido alkanols with polyisocyanates in the presence of suitable catalysts. Further examples of fluorochemical compounds include fluorinated carboxylates, as described in, for example, U.S. Pat. No. 4,681,790 or fluorinated phosphates, such as described in U.S. Pat. No. 3,094,547.

The fluorochemical compounds for admixture with the grout powder include compounds that have one or more groups capable of reacting with one or more components of the grout powder as well as compounds that do not contain such reactive groups. Preferably, the fluorochemical compound includes at least one group capable of reacting with one or more components of the grout powder. A particularly suitable group capable of such reaction is a silyl group that has one or more hydrolyzable groups.

Examples of fluorochemical compounds capable of reacting with the grout powder or one of its components include those that can be represented by the formula I:

$$(R_f)_n SiY_{4-n} \qquad \text{I}$$

wherein $R_f$ represents a fluorinated organic group for example as described above, n being 1 or 2 and Y represents an alkyl group, an aryl group or a hydrolysable group. Each Y can be the same or different and at least one Y group is a hydrolysable group. Y can be for example a $C_1$-$C_{30}$ alkyl group, which may be straight chained or branched and may include one or more aliphatic, cyclic hydrocarbon structures, a $C_6$-$C_{20}$ aryl group (optionally substituted by one or more substituents selected from halogens and $C_1$-$C_4$ alkyl groups), or a $C_7$-$C_{20}$ aralkyl group.

Suitable hydrolysable groups include those that are generally capable of hydrolyzing under appropriate conditions of admixture with the grout powder or one of its components, for example under aqueous, acidic or basic conditions, such that the fluorochemical silane compound can undergo condensation reactions. Preferably, the hydrolysable groups upon hydrolysis yield groups capable of undergoing condensation reactions, such as silanol groups.

Examples of hydrolysable groups include halide groups, such as chlorine, bromine, iodine or fluorine, alkoxy groups —OR' (wherein R' represents a lower alkyl group, preferably containing 1 to 6, more preferably 1 to 4 carbon atoms and which may optionally be substituted by one or more halogen atoms), acyl groups, acyloxy groups —O(CO)—R" (wherein R" represents a lower alkyl group, preferably containing 1 to 6, more preferably 1 to 4 carbon atoms, which may be optionally substituted by one or more halogen atoms), aryloxy groups —OR'" (wherein R'" represents an aryl moiety, preferably containing 6 to 12, more preferably containing 6 to 10 carbon atoms, which may be optionally substituted by one or more substituents independently selected from halogens, and $C_1$-$C_4$ alkyl groups which may optionally be substituted by one or more halogen atoms). In the above formulae R', R", and R'" may include branched structures.

Suitable hydrolysable groups also include polyoxyalkylene groups of the formula

—O-A-$R^3$ wherein A is a divalent hydrophilic group having the formula

—(CHR$^4$—CH$_2$O—)$_q$— wherein q is a number having a value of 1 to 40, preferably 2 to 10, $R^4$ is hydrogen or methyl, and at least 70% of $R^4$ is hydrogen, and $R^3$ independently is hydrogen or a lower alkyl group having 1 to 4 carbon atoms, such as disclosed in U.S. Pat. No. 5,274,159. Specific examples of hydrolysable groups include methoxy, ethoxy and propoxy groups, chlorine and an acetoxy group. Particularly preferred hydrolysable groups include $C_1$-$C_4$ alkoxy groups, such as methoxy and ethoxy groups.

In a particularly preferred embodiment, $R_f$ in formula I corresponds to the formula II:

$$R^a_f\!-\!X\!-\!$$

wherein X represents an organic linking group or a chemical bond. The divalent linking group X can include linear, branched, or cyclic structures, that may be saturated or unsaturated. The group X is generally non-fluorinated and can contain one or more heteroatoms (e.g., oxygen, nitrogen, or sulfur) or functional groups (e.g., carbonyl, amido, urethanylene or sulfonamido). Preferably, the divalent linking group X is a hydrocarbon group, preferably, a linear hydrocarbon group, optionally containing heteroatoms or functional groups, and more preferably, containing at least one functional group. Examples of X groups include —C(O)NH (CH$_2$)$_3$—, —CH$_2$O(CH$_2$)$_3$—, —CH$_2$OC(O)N(R)(CH$_2$)$_3$—, wherein R is H or lower alkyl group, and —(C$_n$H$_{2n}$)—, wherein n is about 2 to about 6. A preferred linking group X is —C(O)NH(CH$_2$)$_3$— and —OC(O)NH(CH$_2$)$_3$—.

In one embodiment, $R^a_f$ represents a perfluorinated aliphatic radical having at least 3 carbon atoms. In an further embodiment, $R^a_f$ represents a partially or fully fluorinated (i.e., all C—H bonds are replaced by C—F bonds) polyether group including perfluorinated repeating units selected from the group of —(C$_n$F$_{2n}$)—, —(C$_n$F$_{2n}$O)—, —(CF(Z))—, —(CF(Z)O)—, —(CF(Z)C$_n$F$_{2n}$O)—, —(C$_n$F$_{2n}$CF(Z)O)—, —(CF$_2$CF(Z)O)—, and combinations thereof. In these repeating units Z is a perfluoroalkyl group, an oxygen-substituted perfluoroalkyl group, a perfluoroalkoxy group, or an oxygen-substituted perfluoroalkoxy group, all of which can be linear, branched, or cyclic, and preferably have about 1 to about 9 carbon atoms and 0 to about 4 oxygen atoms. The terminal groups can be (C$_n$F$_{2n+1}$)—, (C$_n$F$_{2n+1}$O)— or (X'C$_n$F$_{2n}$O)—, wherein X' is H, Cl, or Br, for example. Preferably, these terminal groups are perfluorinated. In these repeating units or terminal groups, n is 1 or more, and preferably 1 to 4. Particularly preferred approximate average structures for a perfluoropolyether group include C$_3$F$_7$O(CF (CF$_3$)CF$_2$O)$_p$CF(CF$_3$)— and CF$_3$O(C$_2$F$_4$O)$_p$CF$_2$— wherein an average value for p is 1 to about 50. Examples of polyfluoropolyethers made of these repeating units are disclosed in U.S. Pat. No. 5,306,758 (Pellerite).

In still another embodiment, $R^a_f$ represents a fluorinated oligomer of formula M$^f_s$M$^h_t$, wherein M$^f$ represents units derived from a fluorinated monomer, M$^h$ represents units derived from non-fluorinated monomers, s represents a value of 1 to 40, t represents a value of 0 to 40 and the sum of s and t is at least 2.

The units M$^f$ are generally derived from fluorochemical monomers corresponding to the formula:

$$R^b_f\!-\!Q\!-\!E^1 \qquad \text{IV}$$

wherein $R^b_f$ represents a fluoroaliphatic group containing at least 3 carbon atoms or a fluorinated polyether group. Q represents an organic divalent linking group and $E^1$ represents a free radical polymerizable group.

Fluorochemical monomers $R_f^b$-Q-$E^1$ as described above and methods for the preparation thereof are known and disclosed, e.g., in U.S. Pat. No. 2,803,615. Examples of such compounds include general classes of fluorochemical acrylates, methacrylates, vinyl ethers, and allyl compounds containing fluorinated sulfonamido groups, acrylates or methacrylates derived from fluorochemical telomer alcohols, acrylates or methacrylates derived from fluorochemical carboxylic acids, and perfluoroalkyl acrylates or methacrylates as disclosed in EP-A-526 976. Fluorinated polyetheracrylates or methacrylates are described in U.S. Pat. No. 4,085,137.

The units $M^h$ are generally derived from a non-fluorinated monomer, preferably a monomer consisting of a polymerizable group and a hydrocarbon moiety. Hydrocarbon group containing monomers are well known and generally commercially available. Useful hydrocarbon containing monomers include those according to formula:

$$R^h\text{-}Q^1_s\text{-}E^2 \qquad\qquad V$$

wherein $R^h$ represents a hydrocarbon group, $Q^1$ is a divalent linking group, s is 0 or 1 and $E^2$ is a free radical polymerizable group. Examples of linking groups $Q^1$ include oxy, carbonyl, carbonyloxy, carbonamido, sulphonamido, oxyalkylene and poly(oxyalkylene). Examples of non-fluorinated monomers from which the units $M^h$ can be derived include general classes of ethylenic compounds capable of free-radical polymerization.

Fluorochemical compounds having a divalent fluorinated organic group include for example those that correspond to the formula:

$$(Y)_3Si\text{—}X^f\text{—}Si(Y)_3$$

wherein Y represents an alkyl group, or a hydrolysable group as defined above and $X^f$ representing a fluorinated or perfluorinated organic divalent group. In a particularly preferred embodiment $X^f$ corresponds to the formula:

$$\text{-}L^1\text{-}Q^f\text{-}L^2\text{-}$$

wherein $L^1$ and $L^2$ each independently represents an organic divalent linking group or a chemical bond and $Q^f$ represents a perfluorinated aliphatic group of at least 3 carbon atoms. Examples of $Q^f$ include divalent polyfluoropolyether that can include linear, branched, and/or cyclic structures, that may be saturated or unsaturated, and substituted with one or more oxygen atoms. $Q^f$ preferably is a perfluorinated group (i.e., all C—H bonds are replaced by C—F bonds). More preferably, it includes perfluorinated repeating units selected from the group of —$(C_nF_{2n})$—, —$(C_nF_{2n}O)$—, —$(CF(Z))$-, —$(CF(Z)O)$—, —$(CF(Z)C_nF_{2n}O)$—, —$(C_nF_{2n}CF(Z)O)$—, —$(CF_2CF(Z)O)$—, and combinations thereof, wherein the repeating units generally may be randomly, blocky or alternating arranged.

In these repeating units Z is a perfluoroalkyl group, an oxygen-substituted perfluoroalkyl group, a perfluoroalkoxy group, or an oxygen-substituted perfluoroalkoxy group, all of which can be linear, branched, or cyclic, and preferably have about 1 to about 9 carbon atoms and 0 to about 4 oxygen atoms. Examples of polyfluoropolyethers containing polymeric moieties made of these repeating units are disclosed in U.S. Pat. No. 5,306,758 (Pellerite).

Preferred approximate average structures for a divalent perfluoropolyether group include —$CF_2O(CF_2O)_m(C_2F_4O)_pCF_2$—, wherein an average value for m is 0 to about 50 and an average value for p is 0 to about 50, with the proviso that both m and p are not simultaneously 0, —$CF(CF_3)O(CF(CF_3)CF_2O)_pCF(CF_3)$—, —$CF_2O(C_2F_4O)_pCF_2$—, and —$(CF_2)_3O(C_4F_8O)_p(CF_2)_3$—, wherein an average value for p is 3 to about 50. The repeating units characterized by m and p generally may be randomly, blocky or alternating arranged.

Of these, particularly preferred approximate average structures are
—$CF_2O(CF_2O)_m(C_2F_4O)_pCF_2$—, —$CF_2O(C_2F_4O)_pCF_2$—, and
—$CF(CF_3)O(CF(CF_3)CF_2O)_pCF(CF_3)$—.

As synthesized, these structures typically include a mixture of polymeric units. The approximate average structure is the approximate average of the mixture of structures. The divalent linking groups $L^1$ and $L^2$ may be the same or different and can include linear, branched, or cyclic structures, that may be saturated or unsaturated, and preferably contain 1 to 15 atoms. The groups $L^1$ and $L^2$ can contain one or more heteroatoms (e.g., oxygen, nitrogen, or sulfur) and/or one or more functional groups (e.g., carbonyl, amido, urethanylene or sulfonamido). It can also be substituted with one or more halogen atoms (preferably, fluorine atoms), although this is less desirable, as this might lead to instability of the compound. The divalent linking groups $L_1$ and $L^2$ preferably are substantially stable against hydrolysis.

For example, $L_1$ and $L^2$ may be a saturated or unsaturated hydrocarbon group typically including 1 to 15 carbons atoms. Preferably $L^1$ and $L^2$ are linear hydrocarbon groups preferably containing 1 to 10 carbon atoms, and optionally containing 1 to 4 heteroatoms and/or 1 to 4 functional groups, and more preferably, containing at least one functional group.

Examples of $L^1$ and $L^2$ groups include —$C(O)NH(CH_2)_3$—, —$CH_2O(CH_2)_3$—, —$OC(O)NH(CH_2)_3$— and —$CH_2OC(O)N(R)(CH_2)_3$—, wherein R is H or lower alkyl group (preferably containing 1 to 4 carbon atoms, such as methyl, ethyl, n- and iso-propyl, and n- and iso-butyl), and —$(C_nH_{2n})$—, wherein n is about 2 to about 6. Preferred linking groups $L^1$ and $L^2$ are —$C(O)NH(CH_2)_3$— and —$OC(O)NH(CH_2)_3$—.

Fluorochemical compounds suitable for use in the grout powder typically have a molecular weight (number average) of at least about 400, and preferably, at least about 500. Preferably, they are no greater than about 100000.

The fluorochemical compound may be used as a solution or dispersion in one or more organic solvents. Suitable organic solvents, or mixtures of solvents can be selected from aliphatic alcohols (preferably containing 1 to 6 carbon atoms), such as methanol, ethanol, isopropylalcohol; ketones such as acetone or methyl ethyl ketone; esters, such as ethyl acetate, methylformiate, ethers, such as diethyl ether and alkanes, such as heptane. Mixtures of solvents may be used. Particularly preferred solvents include ethanol and acetone.

Fluorinated solvents may be used in combination with the organic solvents in order to improve solubility of the fluorochemical compound. Examples of fluorinated solvents include fluorinated hydrocarbons, such as perfluorohexane or perfluorooctane, available from 3M; partially fluorinated hydrocarbons, such as pentafluorobutane, available from Solvay, or $CF_3CFHCFHCF_2CF_3$, available from DuPont; hydrofluoroethers, such as methyl perfluorobutyl ether or ethyl perfluorobutyl ether, available from 3M. Various blends of these materials with organic solvents can be used.

The fluorochemical composition may include further additives. For example, in case the fluorochemical compound is a fluorochemical silane, the composition will generally include water, in order to facilitate the reaction of the fluorochemical silane with the surface of one or more of the components of the grout powder although humidity in the powder or air may suffice as well. Preferably, the amount of water will be between 0.1 and 20% by weight. More preferably between 1 and 10% by weight. In addition to water, a fluorochemical silane containing composition may also include an organic or inorganic acid or a base. Organic acids include acetic acid, citric acid, formic acid and the like; fluorinated organic acids, such as $CF_3SO_3H$, $C_3F_7COOH$, $C_7F_{15}COOH$, $CF_3(CF_2)_2OCF(CF_3)COOH$ or $C_3F_7O(CF(CF_3)CF_2O)_{10-30}CF(CF_3)COOH$, commercially available from DuPont. Examples of inorganic acids include sulphuric acid, hydrochloric acid and the like. Examples of useful bases include sodium hydroxide, potassium hydroxide and triethylamine. The acid or base will generally be included in the composition in an amount between about 0.01 and 10%, more preferably between 0.05 and 5% by weight.

Grout powder for admixture with water to produce grout typically comprises cement, such as Portland cement, in amounts between about 30% and 50% by weight and quartz in amounts between 50% and 70% by weight. Other additives, such as glass bubbles, epoxyresins, silicone resins and acrylic resins may be added. The additives will typically be used in amounts between about 0 and 10%, preferably between 0 and 5% by weight. The grout powder for admixture with water to produce grout, can be treated or mixed with a fluorochemical compound by mixing the fluorochemical compound with the grout powder or mixing it with one or more components thereof and then mixing these components with the other components of the grout powder. Generally, the obtained grout powder will have the fluorochemical compound distributed throughout the mass of the grout powder.

Thus, in accordance with one embodiment to produce the grout powder, the fluorochemical compound, dissolved or dispersed in solvent, optionally containing water and acid or base, may be mixed with dry grout powder. The mixture of grout powder and fluorochemical compound can typically be dried at a temperature between about 30° C. and 150° C., preferably at a temperature between 60° C. and 120° C. and for a time sufficient to dry the grout powder.

In an alternative way, the fluorochemical compound, preferably dissolved or dispersed in solvent, optionally containing water and acid or base, can be mixed with a component that will be a constituent of the final grout powder. That component is then mixed with the other components of the grout powder to obtain the grout powder having admixed therewith the fluorochemical compound. The mixture of the grout component and fluorochemical compound can be dried at a temperature between about 30° C. and 150° C., preferably at a temperature between 60° C. and 120° C. and for a time sufficient to dry the component. Suitable grout components that may be so admixed or treated with the fluorochemical compound include for example quartz, cement or certain additives of the grout powder such as glass bubbles.

To obtain the final grout for filling for example spaces between ceramic tiles, the grout powder is generally admixed with water.

The amount of the fluorochemical compound that will generally be contained in the grout powder in accordance with the invention is chosen so that sufficiently high oil and water repellency properties and/or stain repellency properties are imparted to the final grout produced therefrom. This amount is usually such that 0.01% to about 5% by weight, preferably 0.05% to about 3% by weight, based on the weight of the grout powder, of fluorochemical compound is present in the grout powder. The amount of fluorochemical compound is preferably kept below 5%, in order to avoid that the grout becomes too repellent by itself and/or that adhesion problems between the grout and the substrate occur. The amount which is sufficient to impart desired properties can be determined empirically and can be increased as necessary or desired. The amount of fluorchemical compound used in the grout powder will generally be such that amount sufficient to produce grout which is water and oil repellent, such a grout having at 20° C. a contact angle with distilled water of at least 70°, and a contact angle with n-hexadecane of at least 30°, measured after drying and curing of the grout.

The fluorochemical compound may be used together with further additives that provide the grout with additional beneficial properties, such as antimicrobial or fungicidal properties. Examples include $C_{18}H_{37}N^+(CH_3)(CH_2)_3Si(OCH_3)_3$ $Cl^-$. However, the addition of ionic additives is preferably kept below about 10% by weight, in order not to adversely affect the water repellency properties of the composition. The use of the fluorochemical compound in the grout powder results in rendering the grout less retentive of soil and more readily cleanable due to the oil and water repellent nature of the treated grout. These desirable properties are maintained despite extended exposure or use and repeated cleanings because of the high degree of durability of the treated grout as can be obtained through the compositions of this invention.

The mixture of grout powder, comprising fluorochemical compound, and water can be applied by simple means of a spatula or a pointing-trowel in between pre-glued tiles. About 30 minutes after application of the grout mixture, the excess grout can typically be removed by means of a wet sponge. The tiles and semi-dried grout can subsequently be wiped with a wet cloth, so as to reestablish the original esthetics of the tile and to smoothen the grout filling. After drying for 24 hours at room temperature, the grout filling can be considered to be complete.

The grout powder is preferably used to fill spaces between tiles, in particular ceramic tiles, that have been or that are being treated with fluorochemical compound, in particular with fluorochemical compounds that have a one or more silyl groups such as the silyl group containing compounds described above. As result, a complete surface durable oil- and water repellent can be achieved in a convenient and cost effective way.

EXAMPLES

The following examples further illustrate the invention without the intention however to limit the invention thereto. All parts are by weight unless indicated otherwise.

Abbreviations

HFE-7100: methyl perfluorobutylether, available from 3M

FC-1: 60% solution of N-methyl-N-[3-trichlorosilyl)propyl]-perfluorooctylsulfonamide in ethanol, prepared essentially according to GB Pat. No. 2,218,097, example 1.

FC-2: 30% solution of fluorochemical acrylate copolymer in ethyl acetate/heptane, prepared by reacting N-methyl perfluorooctyl sulfonamido ethyl methacrylate with octadecylmethacrylate in a ratio 65/35. The polymerization reaction was done under nitrogen atmosphere, in a solvent mixture of ethyl acetate/heptane 70/30 at 30% solids, using AIBN as initiator.

FC-3: 30% solution of fluorochemical urethane (PAPI/N-ethyl perfluorooctyl sulfonamido ethyl alcohol/2-ethylhexanol 9.8/27.1/3.1) in ethyl acetate, prepared as follows: the reagents were placed in a three necked flask, equipped with a stirrer, heating mantle, thermometer and condenser, in a ratio as given above. Ethyl acetate was added to obtain a 30% solids mixture. The reaction mixture was heated to 50° C. under nitrogen atmosphere. DBTDL catalyst was added and the mixture was heated to reflux until all isocyanate had reacted.

FC-4: 2% solution of a copolymer of perfluoroheptyl methylmethacrylate/acrylic acid 98/2, in HFE 7100, made essentially according to PCT Appln. No. WO 9916809, example 12.

FC-5: fluorochemical polyetherdisilane, prepared by reacting perfluoropolyetherdiester $CH_3OC(O)CF_2(CF_2O)_{9-11}(CF_2CF_2O)_{9-11}CF_2C(O)OCH_3$ (with average molecular weight of about 2000), commercially available from Ausimont, Italy, under the trade designation Z-DEAL, with 3-aminopropyltrimethoxysilane, available from Aldrich Company Co., as taught in U.S. Pat. No. 3,810,874 (Mitsch et al.), table 1, line 6. The exothermic reaction proceeded readily at room temperature, simply by mixing the starting materials. The progress of the reaction was monitored by infrared analysis.

PAPI: polyaromatic polymethylene polyisocyanate, available from Dow Chemical

Grout Application

A mixture of grout powder, comprising fluorochemical compound, and water was applied in between pre-glued tiles, available from Jasba, by means of a spatula. After 30 minutes, the excess grout was removed with a wet cloth. The grout was allowed to dry at room temperature during 24 hours. The dried grout was abraded 20 times using a wet Scotch-Brite™ sponge.

added and the grout was stirred to make a homogeneous, coagulate-free mixture. Comparative example C-1 was made with grout that did not contain the fluorochemical compound (mixture of grout powder, comprising 40% Portland cement and 60% quartz, and water). Each of the grout mixtures was applied in between pre-glued tiles according to the general method. The grout was allowed to dry at room temperature during 24 hours.

In comparative examples C-2 and C-3 the grout was made in the same way as comparative example C-1, i.e. no fluorochemical compound was mixed in the grout, but the obtained dried and cured grout was subjected to a topical treatment with a fluorochemical compound. Therefore, the dried untreated grout as prepared according to comparative example 1 was treated with a mixture comprising 3% FC-1, 3% acetic acid, 10% water and 84% ethanol through a brush application at about 100 ml/m² (comparative example 2). In comparative example C-3 FC-4 was used instead of FC-1. The topically treated grout was allowed to dry at room temperature during 24 hours.

The grout of the examples and comparative examples was abraded 20 times with a wet Scotch-Brite™ sponge. Contact angles were measured before and after abrasion. The results are given in table 1.

TABLE 1

Contact angles of grout obtained from grout powder mixed with fluorochemical compound

| | | Contact angles (°) | | | |
|---|---|---|---|---|---|
| Ex | Fluorochemical compound | Initial Water | Initial hexadecane | Abrasion Water | Abrasion hexadecane |
| 1 | FC-1 | 95 | 60 | 85 | 55 |
| 2 | FC-3 | 90 | 68 | 80 | 60 |
| 3 | FC-2 | 80 | 65 | 70 | 50 |
| C-1 | / | <20 | <20 | <20 | <20 |
| C-2 | FC-1 (topical treatment) | 95 | 65 | 50 | 25 |
| C-3 | FC-4 (topical treatment) | 110 | 68 | 55 | 22 |

Contact Angles

Dried grout was tested for water- and oil repellency, by measuring the contact angles versus respectively water (W) and n-hexadecane (O), using an Olympus TGHM goniometer. The contact angles were measured before ("initial") and directly after the samples were abraded 20 times with a wet Scotch-Brite™ sponge ("abrasion"). The values were the mean values of 4 measurements and were reported in degrees. The minimum measurable value for a contact angle was 20. A value <20 meant that the liquid spread on the surface. A contact angle with distilled water of at least 70° was indicative of good water repellency; a contact angle with n-hexadecane of at least 30° was indicative of good oil repellency.

EXAMPLES

Examples 1 to 3 and Comparative Examples C-1 to C-3

In example 1, 100 g dry grout powder, comprising 40% Portland cement and 60% quartz, was mixed with 100 g fluorochemical composition comprising 2 g FC-1, 3 g acetic acid, 10 g water and 85 g ethanol. In examples 2 and 3, 100 g dry grout powder, comprising 40% Portland cement and 60% quartz, was mixed with 3 g of FC-3 (Ex 2) or 3 g of FC-2 (Ex 3), dissolved in 20 g ethyl acetate. After mixing, the grout powders were dried at 120° C. during 15 minutes. Water was As can be seen from table 1, the results indicate that grout with high oil and water repellency could be made, when the grout powder had been treated with a fluorochemical compound. Not only high initial oil and water repellency was obtained, but also after abrasion, indicating high durability of the treatment. Untreated grout did not show any oil-and/or water repellency. A topical treatment with fluorochemical compounds provides grout with initial good oil- and water repellency. However the performance drops after abrasion, indicating low durability of the treatment.

Examples 4 and 5

In example 4, 100 g dry quartz was treated with 100 g of a mixture comprising 2% FC-1, 3% acetic acid, 10% water and 85% ethanol. In example 5, 100 g dry quartz was treated with 3 g FC-3, dissolved in 20 g ethylacetate. The mixtures were mixed with a spatula during 5 min and dried at 120° C. during 15 minutes. 60 g of the treated quartz was mixed with 40 g Portland cement. 20-30 g water were added and the compounds were mixed with a spatula to obtain a homogeneous composition. The grout was applied between pre-glued tiles and dried according to the general procedure. The dried grout was evaluated for oil and water repellency, before and after abrasion. The results of the contact angles are given in table 2.

TABLE 2

Contact angles of grout obtained from grout powder, comprising quartz treated with a fluorochemical compound

| Ex | Fluorochemical compound | Contact angles (°) | | | |
|---|---|---|---|---|---|
| | | Initial Water | Initial hexadecane | Abrasion Water | Abrasion hexadecane |
| 4 | FC-1 | 96 | 65 | 70 | 52 |
| 5 | FC-3 | 80 | 55 | 65 | 45 |

The results in table 2 show that grout powder, made from quartz, treated with fluorochemical compound, and untreated Portland cement, provided a grout composition that had high oil- and water repellency, not only initially, but also after abrasion. High durable oil- and water repellent compositions were made.

Example 6

In example 6, 100 g Portland cement was mixed with 100 g of a composition comprising 2% FC-1, 3% acetic acid, 10% water and 85% ethanol. After mixing for 5 min, the cement was dried at 120° C. during 15 minutes. 40 g of the treated cement was mixed with 60 g untreated quartz. 20-30 g water were added and the compounds were mixed with a spatula to obtain a homogeneous composition. The grout was applied between pre-glued tiles and dried according to the general procedure. The dried grout was evaluated for oil and water repellency, before and after abrasion. The results of the contact angles are given in table 3.

TABLE 3

Contact angles of grout obtained from grout powder comprising Portland cement treated with a fluorochemical compound

| Ex | Fluorochemical compound | Contact angles (°) | | | |
|---|---|---|---|---|---|
| | | Initial Water | Initial hexadecane | Abrasion Water | Abrasion hexadecane |
| 6 | FC-1 | 85 | 60 | 70 | 50 |

The results indicate that grout, made from grout powder, comprising Portland cement, treated with a fluorochemical treating agent, had high oil and water repellency, not only initially, but also after abrasion.

Examples 7 and 8

In example 7, 10 g glassbubbles were mixed with 100 g of a solution comprising 2% FC-1, 3% acetic acid, 10% water and 85% ethanol. In example 8, FC-4 was dried to 100% solids; 3 g solids were redissolved in 20 g HFE 7100. This solution was mixed with 10 g glassbubbles. After mixing for 5 min, the glassbubbles were dried at 120° C. during 15 minutes. 5 g of the treated glassbubbles were mixed with 100 g grout powder, comprising 40% Portland cement and 60% quartz. After the addition of water and mixing to obtain a homogeneous composition, the grout was applied according to the general procedure. Dried grout was tested for oil and water repellency. The contact angles, measured before and after abrasion are recorded in table 4.

TABLE 4

Contact angles of grout obtained from grout powder comprising glassbubbles treated with fluorochemical compound

| Ex | Fluorochemical compound | Contact angles (°) | | | |
|---|---|---|---|---|---|
| | | Initial Water | Initial hexadecane | Abrasion water | Abrasion hexadecane |
| 7 | FC-1 | 95 | 60 | 80 | 50 |
| 8 | FC-4 | 98 | 63 | 80 | 54 |

The results indicate that grout having high oil- and water repellency, both initially and also after abrasion, could be made when the grout powder was mixed with glassbubbles, that had been treated with fluorochemical compound.

Examples 9 and 10

In example 9, 100 g dry grout powder, comprising 40% Portland cement and 60% quartz, was mixed with 1 g FC-5, dissolved in 100 g HFE. After mixing with a spatula for 5 min, the treated grout powder was dried at 120° C. during 15 min. In example 10, 100 g dry quartz was mixed with 1 g FC-5, dissolved in 100 g HFE. After mixing for 5 min, the treated quartz was dried at 120° C. during 5 min. 60 g of the treated quartz was mixed with 40 g Portland cement to produce grout powder. Water was added to the grout powders of examples 9 and 10 and the compositions were mixed to form homogeneous grout. The grout was applied between pre-glued tiles and dried according to the general procedure. The dried grout was evaluated for oil and water repellency, before and after abrasion. The results of the contact angles are given in table 5.

TABLE 5

Contact angles of grout obtained from grout powder or quartz treated with fluorochemical compound.

| | | Contact angles (°) | | | |
|---|---|---|---|---|---|
| Ex | Treated compound | Initial Water | Initial hexadecane | Abrasion Water | Abrasion hexadecane |
| 9 | Grout powder | 92 | 44 | 90 | 30 |
| 10 | Quartz | 90 | 57 | 78 | 35 |

As can be seen from the results, grout with good oil and water repellency could be made.

The invention claimed is:

1. Grout formed by:
   (a) combining a solution or suspension of an organic fluorochemical compound in an organic solvent with a grout powder to form a mixture;
   (b) drying the mixture to remove the solvent and provide a treated grout powder;
   (c) admixing the treated group powder with water to form wet grout; and
   (d) drying the wet grout;
   wherein said fluorochemical compound corresponds to the formula:

$(R_f)_n SiY_{4-n}$ wherein $R_f$ represents a fluorinated organic group, Y represents an alkyl group, an aryl group, or a hydrolysable group, each Y group being the same or different and at least one Y group being a hydrolysable group and n being 1 or 2.

2. Grout according to claim 1 wherein said fluorochemical compound has a functional group capable of reacting with the surface of one or more components of said grout powder.

3. Grout according to claim 1 wherein $R_f$ corresponds to the formula:

$R^a_f-X-$ wherein X represents an organic linking group or a chemical bond, $R^a_f$ represents a perfluorinated aliphatic group having at least 3 carbon atoms, a perfluorinated or partially fluorinated polyether or a fluorinated oligomer of the formula $M^f_s M^h_t$ wherein $M^f$ represents units derived from a fluorinated monomer, $M^h$ represents units derived from non-fluorinated monomers, s represents a value of 1 to 40, t represents a value of 0 to 40 and the sum of s and t is at least 2.

4. Grout according to claim 1 wherein said grout powder comprises quartz particles.

5. Grout according to claim 1 wherein said grout powder comprises glass bubbles compound.

6. Grout according to claim 1 wherein said hydrolysable group is a $C_1$-$C_4$ alkoxy group.

7. A method of preparing grout comprising:
   (a) combining a solution or suspension of an organic fluorochemical compound in an organic solvent with a grout powder component to form a mixture;
   (b) drying the mixture to remove the solvent and provide a treated grout powder component;
   (c) combining the treated grout powder component with additional grout powder components to provide a curable grout powder;
   (d) mixing the curable grout powder with water to form grout;
   (e) applying the grout to a substrate; and
   (f) curing the grout;
   wherein said organic fluorochemical compound corresponds to formula (I) or (II):

$(R_f)_n SiY_{4-n}$ (I)

wherein $R_f$ represents a fluorinated organic group, Y represents an alkyl group, an aryl group, or a hydrolysable group, each Y group being the same or different and at least one Y group being a hydrolysable group and n being 1 or 2 and said grout powder comprises said fluorochemical compound in an amount of 0.05% to 5% by weight on the total weight of grout powder;

$(Y)_3Si-X^f-Si(Y)_3$ (II)

wherein Y represents an alkyl group, or a hydrolysable group, each Y group being the same or different and at least one Y group being a hydrolysable group and $X^f$ representing a fluorinated or perfluorinated organic divalent group.

8. The method of claim 7 wherein said fluorochemical compound corresponds to formula (I).

9. The method of claim 8 wherein $R_f$ corresponds to the formula:

$R^a_f-X-$ wherein X represents an organic linking group or a chemical bond, $R^a_f$ represents a perfluorinated aliphatic group having at least 3 carbon atoms, a perfluorinated or partially fluorinated polyether or a fluorinated oligomer of the formula $M^f_s M^h_t$ wherein $M^f$ represents units derived from a fluorinated monomer, $M^h$ represents units derived from non-fluorinated monomers, s represents a value of 1 to 40, t represents a value of 0 to 40 and the sum of s and t is at least 2.

10. The method of claim 7 wherein said fluorochemical compound corresponds to formula (II).

11. The method of claim 10 wherein $X^{10}$ represents a divalent fluorinated or perfluorinated polyether containing organic group or wherein $x^f$ corresponds to the formula:

$-L^1Q^f-L^2-$ wherein $L^1$ and $L^2$ each independently represent an organic divalent linking group or a chemical bond and $Q^f$ represents a perfluorinated aliphatic group of at least 3 carbon atoms.

12. A method of preparing grout comprising:
    (a) combining a solution or suspension of an organic fluorochemical compound in an organic solvent with a grout powder to form a mixture;

(b) drying the mixture to remove the solvent and provide a treated grout powder;
(c) mixing the treated grout powder with water to form grout;
(d) applying the grout to a substrate; and
(e) curing the grout;
wherein said organic fluorochemical compound corresponds to formula (I) or (II):

$$(R_{fn}SiY_{4-n}) \tag{I}$$

wherein $R_f$ represents a fluorinated organic group, Y represents an alkyl group, an aryl group, or a hydrolysable group, each Y group being the same or different and at least one Y group being a hydrolysable group and n being 1 or 2 and said grout powder comprises said fluorochemical $$(Y)_3Si-X^f-Si(Y)_3 \tag{II}$$

compound in an amount of 0.05% to 5% by weight on the total weight of grout powder; wherein Y represents an alkyl group, or a hydrolysable group, each Y group being the same or different and at least one Y group being a hydrolysable group and $X^f$ representing a fluorinated or perfluorinated organic divalent group.

13. The method of claim 12 wherein said fluorochemical compound corresponds to formula (I).

14. The method of claim 13 wherein $R_f$ corresponds to the formula:

$$R^a_f-X-$$

wherein X represents an organic linking group or a chemical bond, $R_f^a$ represents a perfluorinated aliphatic group having at least 3 carbon atoms, a perfluorinated or partially fluorinated polyether or a fluorinated oligomer of the formula $M^f_sM^h_t$ wherein $M^f$ represents units derived from a fluorinated monomer, $M^h$ represents units derived from non-fluorinated monomers, s represents a value of to 40, t represents a value of 0 to 40 and the sum of s and t is at least 2.

15. The method of claim 12 wherein said fluorochemical compound corresponds to formula (II).

16. The method of claim 15 wherein $X^f$ represents a divalent fluorinated or perfluorinated polyether containing organic group or wherein $X^f$ corresponds to the formula:

$$-L^1-Q^f-L^2-$$

wherein $L^1$ and $L^2$ each independently represent an organic divalent linking group or a chemical bond and $Q^f$ represents a perfluorinated aliphatic group of at least 3 carbon atoms.

* * * * *

UNITED STATES PATENT AND TRADEMARK OFFICE
CERTIFICATE OF CORRECTION

PATENT NO.        : 7,704,600 B2
APPLICATION NO.   : 10/147147
DATED             : April 27, 2010
INVENTOR(S)       : Rudolf Dams Page 1 of 1

It is certified that error appears in the above-identified patent and that said Letters Patent is hereby corrected as shown below:

Column 1
Line 40; Delete "on" and insert -- or --, therefor.

Column 6
Line 48; Delete "methylformiate," and insert -- methylformate, --, therefor.

Column 8
Line 2; Delete "fluorchemical" and insert -- fluorochemical --, therefor.

Column 9
Line 16; After "Chemical" insert -- . --.

Column 13
Line 44; Claim 1, delete "group" and insert -- grout --, therefor.

Column 14
Line 6; Claim 5, after "bubbles" delete "compound".
Line 56; Claim 11, delete "$X^{10}$" and insert -- $X^f$ --, therefor.
Line 58; Claim 11, delete "$x^{f}$" and insert -- $X^f$ --, therefor.
Line 59; Claim 11, delete "—$L^1Q^f$—$L^2$—" and insert -- —$L^1$—$Q^f$—$L^2$— --, therefor.

Column 15
Line 9; Claim 12, delete "$(R_{fn}SiY_{4-n}$" and insert -- $(R_f)_n SiY_{4-n}$ --, therefor.

Column 16
Line 11; Claim 14, after "of" insert -- 1 --, therefor.

Signed and Sealed this
Fourth Day of December, 2012

David J. Kappos
*Director of the United States Patent and Trademark Office*